United States Patent
Shin et al.

(10) Patent No.: US 11,951,802 B2
(45) Date of Patent: Apr. 9, 2024

(54) APPARATUS AND METHOD OF CONTROLLING HEATING OF HYBRID ELECTRIC VEHICLE

(71) Applicants: HYUNDAI MOTOR COMPANY, Seoul (KR); KIA MOTORS CORPORATION, Seoul (KR)

(72) Inventors: Dong Jun Shin, Hwaseong-si (KR); Dong Su Ha, Hwaseong-si (KR); Jea Mun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 413 days.

(21) Appl. No.: 17/217,753

(22) Filed: Mar. 30, 2021

(65) Prior Publication Data

US 2022/0118821 A1     Apr. 21, 2022

(30) Foreign Application Priority Data

Oct. 15, 2020     (KR) .................. 10-2020-0133101

(51) Int. Cl.
*B60H 1/00*     (2006.01)
*B60K 6/24*     (2007.10)
*B60W 20/20*     (2016.01)

(52) U.S. Cl.
CPC ......... *B60H 1/00764* (2013.01); *B60W 20/20* (2013.01); *B60K 6/24* (2013.01);
(Continued)

(58) Field of Classification Search
CPC ............ B60H 1/00764; B60H 1/00892; B60H 1/004; B60H 1/0073; B60H 1/00807;
(Continued)

(56) References Cited

U.S. PATENT DOCUMENTS 9,776,469 B1 *     10/2017     Smith ................... B60W 20/15
2014/0109872 A1 *     4/2014     Porras ................... B60H 1/034
                                                                         123/142.5 E
(Continued)

FOREIGN PATENT DOCUMENTS

KR          2007110603 A     * 11/2007

OTHER PUBLICATIONS

Caroline Palm, Real Time Modeling of Engine Coolant Temperature, 2017, Chalmers University of Technology pp. 21 (Year: 2017).*

*Primary Examiner* — Aniss Chad
*Assistant Examiner* — Chase L Cooley
(74) *Attorney, Agent, or Firm* — MORGAN, LEWIS & BOCKIUS LLP (57) ABSTRACT

A method of controlling heating of a hybrid electric vehicle is provided. The method includes receiving a heating request from a driver; determining whether an entry condition of pre-FATC engine ON request (PFEOR) control is satisfied; checking whether the vehicle is capable of entering a HEV mode; determining whether the vehicle enters an idle mode for the PFEOR control; issuing a command for a target engine torque value and a target revolutions per minute for the idle mode to an engine control unit (ECU) from a hybrid control unit (HCU); and performing an engine idle speed control along with engine ON based on the command.

14 Claims, 6 Drawing Sheets

(52) U.S. Cl.
CPC . *B60W 2540/215* (2020.02); *B60W 2710/065* (2013.01); *B60W 2710/0688* (2013.01); *B60W 2710/30* (2013.01); *B60Y 2200/92* (2013.01); *B60Y 2300/182* (2013.01)

(58) Field of Classification Search
CPC ... B60H 1/08; B60W 20/20; B60W 2540/215; B60W 2710/065; B60W 2710/0688; B60W 2710/30; B60W 20/10; B60W 2510/0676; B60W 2540/06; B60W 20/00; B60W 30/192; B60K 6/24; B60Y 2200/92; B60Y 2300/182
See application file for complete search history.

(56) References Cited

U.S. PATENT DOCUMENTS

| | | | |
|---|---|---|---|
| 2016/0159339 A1* | 6/2016 | Cho | B60K 6/442 180/65.265 |
| 2019/0193516 A1* | 6/2019 | Cho | B60H 1/004 |

* cited by examiner

FIG. 1

PRIOR ART

FIG. 2

PRIOR ART

APPARATUS AND METHOD OF CONTROLLING HEATING OF HYBRID ELECTRIC VEHICLE

CROSS-REFERENCE TO RELATED APPLICATION

The present application claims priority to and the benefit of Korean Patent Application No. 10-2020-0133101 filed on Oct. 15, 2020, the entire contents of which are incorporated herein by reference.

TECHNICAL FIELD

The present disclosure relates to an apparatus and method of controlling heating of a hybrid electric vehicle.

BACKGROUND

A hybrid electric vehicle is a vehicle that employs a motor as well as an engine as a driving source to reduce emissions and to improve fuel efficiency and includes a powertrain installed therein to transfer power of the engine or power of the motor to a driving wheel or to transfer both the power of the engine and the power of the motor to the driving wheel.

A PTC heater or an exhaust heat recovery device is additionally used to heat the hybrid electric vehicle, but a basic heat source is provided by the engine.

That is, when the engine is driven to provide a heat source for the hybrid electric vehicle, indoor heating may be achieved by passing an engine coolant at high temperature through the inside of a heater core via engine driving, exchanging heat with the engine coolant at high temperature while the air passes through the outside of the heater core, and then supplying the air to the inside of the vehicle.

However, the hybrid electric vehicle uses power of the motor when traveling at low speed or low torque and uses the power of the engine as well as the power of the motor when traveling at high speed or high torque, and thus is mainly designed to improve fuel efficiency, but the hybrid electric vehicle disadvantageously reduces an effect of reducing fuel efficiency as the engine is forcibly turned on for heating.

SUMMARY

In one aspect, the present disclosure provides a method and apparatus for controlling heating of a hybrid electric vehicle for preventing the vehicle from entering FATC engine ON request (FEOR) control to minimize waste of fuel in a non-driving condition by selectively executing an idle mode due to engine driving depending on a heating load when the vehicle stops for a long time when entering pre-FATC engine ON request (PFEOR) control, thereby improving fuel efficiency.

In a preferred embodiment, a method of controlling heating of a hybrid electric vehicle includes, when a driver requests heating, determining whether an entry condition of pre-FATC engine ON request (PFEOR) control is satisfied, when the entry condition of the PFEOR control is satisfied, checking whether the vehicle is capable of entering a HEV mode, when checking that the vehicle is not capable of entering the HEV mode, determining whether the vehicle enters an idle mode for the PFEOR control, when determining that the vehicle enters the idle mode for the PFEOR control, issuing a command for a target engine torque value and a target RPM for the idle mode to an engine control unit (ECU) from a hybrid control unit (HCU), and performing engine idle speed control along with engine ON according to a command of the HCU by the ECU.

In particular, the determining whether the vehicle is capable of entering the idle mode for the PFEOR control may include determining a coolant hysteresis temperature value $\beta_n$ for each heating load during engine OFF, and comparing the determined coolant hysteresis temperature value $\beta_n$ with a threshold value and determining whether the vehicle enters the idle mode.

Thus, when the coolant hysteresis temperature value $\beta_n$ is less than the threshold value, the vehicle may be determined to enter the idle mode for engine driving for heating, and when the coolant hysteresis temperature value $\beta_n$ is greater than the threshold value, it may be determined that engine driving for heating is not required and the vehicle does not enter the idle mode The coolant hysteresis temperature value $\beta_n$ may be determined using $(\text{PFEOR}_{Off} - \text{PFEOR}_{On}) = -(\text{Gradient}_n * \Delta T) = \beta_n$ obtained by converting $$\text{Gradient}_n = \frac{\Delta \text{Temperature}}{\Delta \text{Time}} = \frac{(\text{PFEOR}_{on} - \text{PFEOR}_{off})}{\Delta T}$$

for deriving the coolant hysteresis temperature value $\beta_n$, where $\text{gradient}_n$ is a coolant temperature descent gradient for each heating load, $\Delta T$ is a temperature variation, $\text{PFEOR}_{on}$ is a coolant temperature in a case of PFEOR control ON, and $\text{PFEOR}_{off}$ is a coolant temperature in a case of PFEOR control OFF.

The threshold value may be determined as a temperature at a level at which entry into FEOR control (FEOR ON) does not occur through preliminary testing.

The method may further include determining a release condition of an engine idle mode for the PFEOR control through calculation using $\text{PFEOR}_{off} = \text{PFEOR}_{on} + \beta_n$, and the method may further include comparing a current engine coolant temperature with the coolant temperature $\text{PFEOR}_{off}$ in the case of PFEOR control OFF and terminating heating control when the current engine coolant temperature is the coolant temperature $\text{PFEOR}_{off}$ in the case of PFEOR control OFF.

In another preferred embodiment, an apparatus for controlling heating of a hybrid electric vehicle includes a full automatic temperature control (FATC) configured to, when a driver requests heating, determine whether an entry condition of pre-FATC engine ON request (PFEOR) control is satisfied, configured to, when the entry condition of the PFEOR control is satisfied, check whether the vehicle is capable of entering a HEV mode, and configured to, when checking that the vehicle is not capable of entering the HEV mode, determine whether the vehicle enters an idle mode for the PFEOR control, a hybrid control unit (HCU) configured to, when determining that the vehicle enters the idle mode for the PFEOR control, issue a command for a target engine torque value and a target RPM for the idle mode to an engine control unit (ECU) using a pre-engine ON request bit signal of the FATC, and the ECU configured to perform engine idle speed control along with engine ON according to a command of the HCU.

DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Hereinafter reference will now be made in detail to various embodiments of the present disclosure, examples of which are illustrated in the accompanying drawings and described below.

Figure 1:
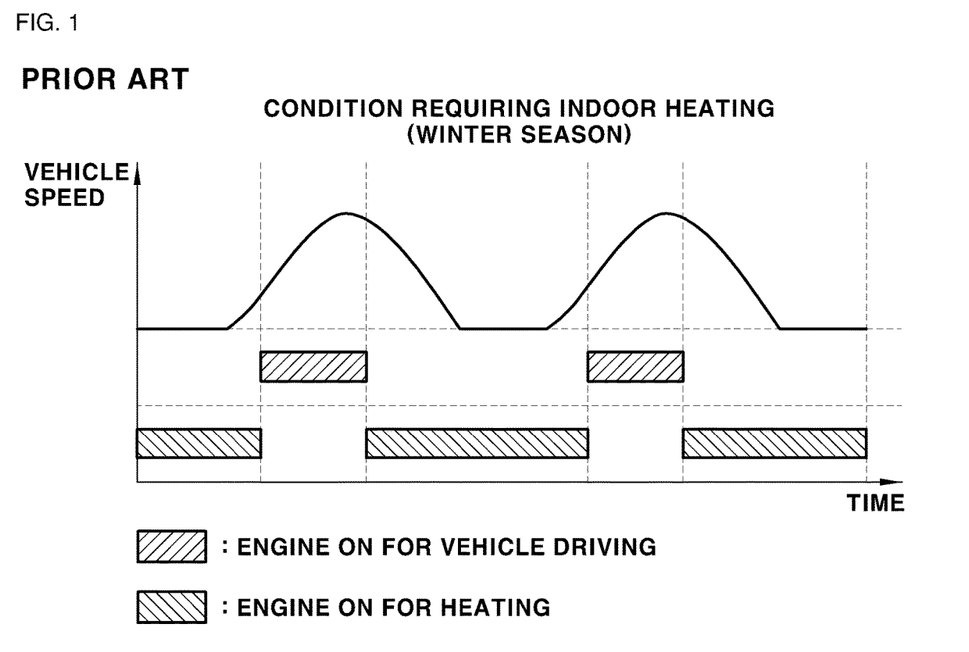
FIG. 1 is a graph showing a conventional method of controlling heating of a hybrid electric vehicle.

As shown in FIG. 1, in the state in which indoor heating is required during the winter season, engine ON for heating is repeatedly performed independently of engine ON for driving the vehicle, and thus an effect of reducing fuel efficiency is disadvantageously reduced due to waste of fuel.

For reference, engine ON for heating may be performed by so-called FATC engine ON request (FEOR) control for forcibly driving the engine independently of engine ON for driving the vehicle.

FEOR control is performed through a procedure of transmitting an engine ON request bit signal to a hybrid control unit (HCU), which is a high-ranking controller of a hybrid electric vehicle via CAN communication in order to maintain a target temperature of the inside of the vehicle through a full automatic temperature control (FATC), which is an air-conditioning controller, a procedure of transmitting a command for forcibly driving engine to an engine control unit (ECU) as an engine controller from the HCU, and other procedures.

However, as shown in FIG. 1, the time spent in the engine ON state for heating is longer than the time spent in the engine ON state for driving the vehicle, and thus waste of fuel greatly occurs in a non-driving state (the state in which an engine is not used for driving the vehicle or the state in which the engine is used for heating only), and accordingly, there is a problem in that fuel efficiency is degraded during the winter season.

Conventionally, in order to overcome the problem, a method of controlling heating, called pre-FATC engine ON request (PFEOR), using cooperative control between the HCU and the FATC is applied.

The PFEOR control is a control method using a concept of pre-engine driving for driving the engine in advance prior to entry into FEOR control, and has the purpose of maintaining and managing the coolant temperature (the temperature of the engine coolant) at a temperature equal to or greater than a predetermined level by driving the engine in advance using an engine operation point with high efficiency when a predetermined condition is satisfied prior to engine ON via FEOR control.

The PFEOR control is performed by transmitting a pre engine ON request bit signal to the HCU, which is a high-ranking controller, from the FATC, which is an air-conditioning controller, prior to entry into the FEOR.

Figure 2:
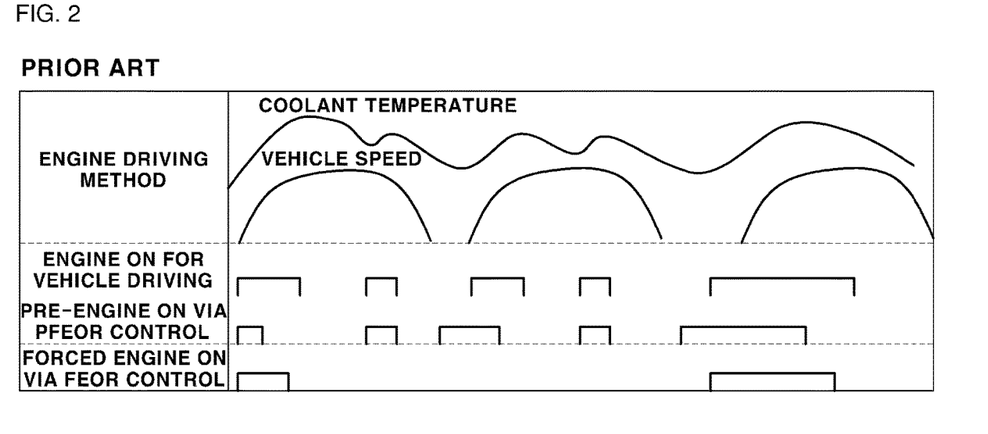
FIG. 2 is a graph showing a procedure of performing forced engine ON via FEOR control and pre-engine ON via PFEOR engine as a conventional method of controlling heating of a hybrid electric vehicle.

As shown in FIG. 2, pre-engine ON via the PFEOR control is performed prior to forced engine ON via the FEOR control, and thus the coolant temperature increases and is maintained and managed at a temperature equal to or greater than a predetermined level.

As such, the coolant temperature is maintained and managed in advance at a temperature equal to or greater than a predetermined level via pre-engine driving via conventional PFEOR control, and thus the frequency with which the engine is forcibly driven and the time spent forcibly driving the engine via FEOR control for heating while a vehicle stops, decelerates, and coasts are reduced, thus improving fuel efficiency of the vehicle during the winter season.

However, when the engine is continuously maintained in an OFF state in the state in which a vehicle stops for a long time while the outside air is cold, the coolant temperature is rapidly lowered, and thus even if the vehicle enters PFEOR control for heating, it is not possible to rapidly increase the coolant temperature to a reference temperature or more, and thus there is a problem in that the PFEOR control is meaningless because the vehicle is switched to FEOR control for forced engine ON for a long time in order to rapidly increase the coolant temperature.

Figure 3:
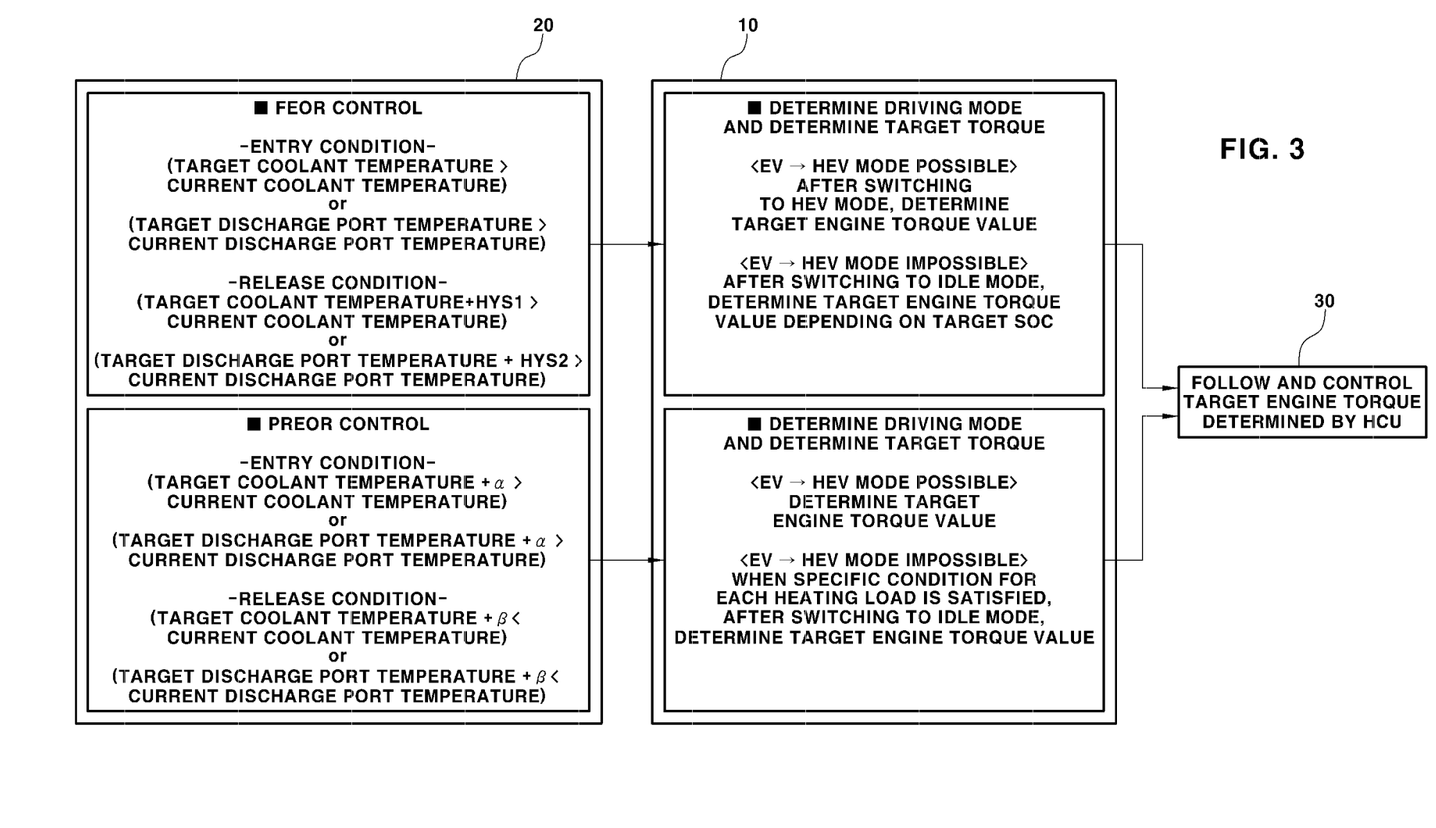
FIG. 3 is a control configuration view of a method of controlling heating of a hybrid electric vehicle in one form of the present disclosure.
Figure 4:
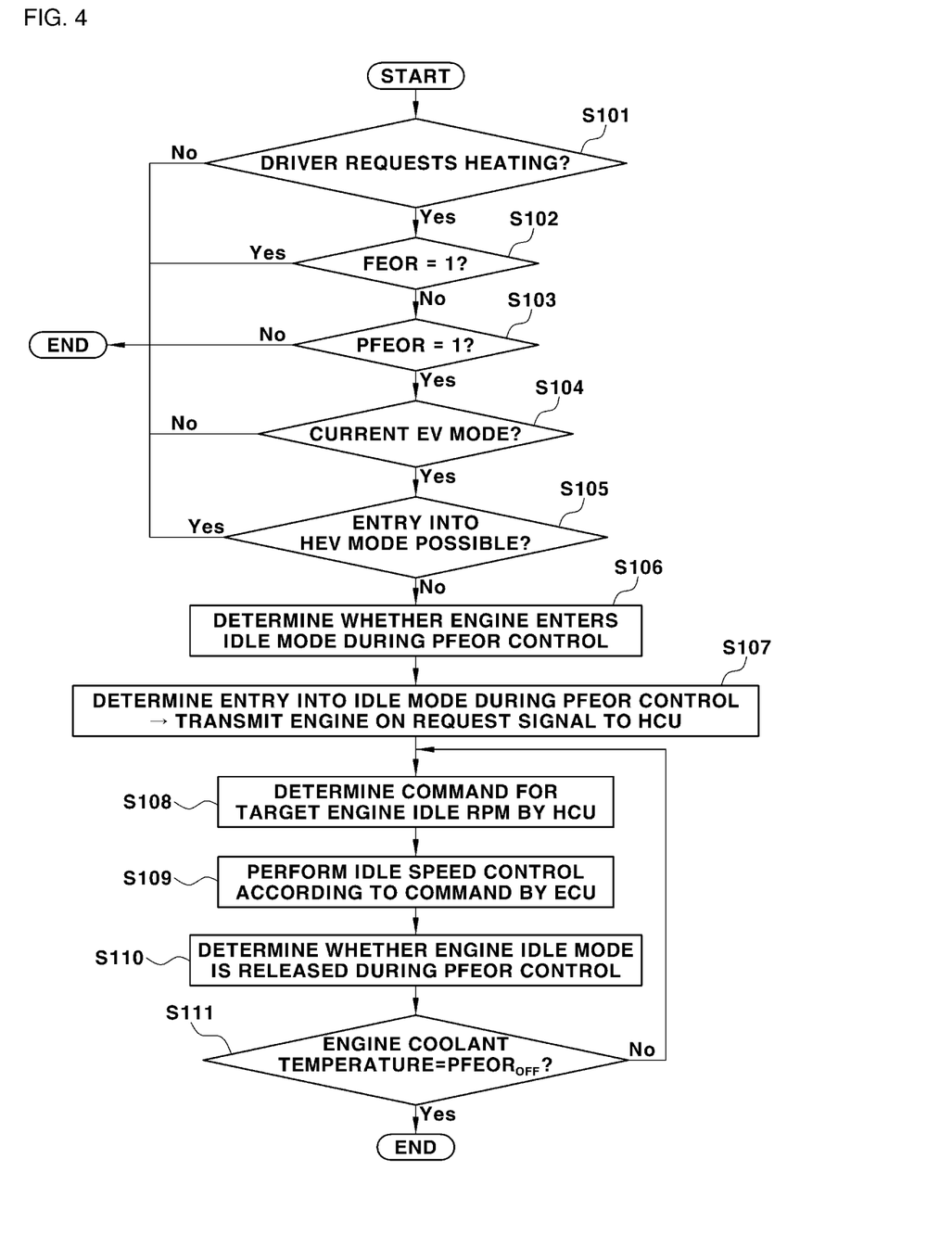
FIG. 4 is a flowchart of a method of controlling heating of a hybrid electric vehicle in one form of the present disclosure.

FIG. 3 is a control configuration view of a method of controlling heating of a hybrid electric vehicle according to the present disclosure. FIG. 4 is a flowchart of a method of controlling heating of a hybrid electric vehicle according to the present disclosure.

First, a full automatic temperature control (FATC) 20, which is an air-conditioning controller checks whether a driver requests heating (S101), and when the driver requests heating, the FATC 20 may determine whether an entry condition of FATC engine ON request (FEOR) control is satisfied (S102).

In this case, the FATC 20 may determine whether an entry condition of FEOR control is satisfied based on the temperature of a discharge port, which is the temperature of an engine coolant or the temperature at which air for heating is ejected to the inside.

For example, the FATC 20 may determine that the entry condition of the FEOR control is satisfied when a target coolant temperature is greater than the current coolant temperature or a target discharge port temperature is greater than the current discharge port temperature.

On the other hand, when the entry condition of the FEOR control is not satisfied, the FATC 20 may determine whether the entry condition of PFEOR control is satisfied (S103).

For example, when the target coolant temperature+α is greater than the current coolant temperature or the target discharge port temperature+α is greater than the current discharge port temperature, the FATC 20 may determine that the entry condition of the PFEOR control is satisfied.

Then, the FATC 20 may check the current driving mode of the hybrid electric vehicle with respect to a hybrid control unit (HCU) 10 (S104) and check whether the vehicle is capable of entering an HEV mode (S105).

In this case, when the driving mode of the hybrid electric vehicle enters an HEV mode, in which the vehicle travels using both motor power and engine power, a basic heat source may be provided by the engine, and thus when the current coolant temperature is greater than the target coolant temperature+β or the current discharge port temperature is greater than the target discharge port temperature+β, a release condition of the PFEOR control may be satisfied.

However, when checking that the current driving mode of the hybrid electric vehicle is an EV mode or that the vehicle is not capable of entering the HEV mode while the vehicle travels slowly or stops, the FATC 20 may determine whether the vehicle enters an idle mode for PFEOR depending on a heating load (S106).

For example, even if the entry condition of the PFEOR control is satisfied, when the engine is continuously maintained in an OFF state in a condition in which a vehicle stops for a long time while the outside air is cold (i.e., the state in which the vehicle is not capable of entering the HEV mode), the coolant temperature is greatly lowered, and thus even if the vehicle enters PFEOR control for heating, it is not possible to rapidly increase the coolant temperature to a reference temperature or more, and thus there is a problem in that the PFEOR control is meaningless because the vehicle is switched to FEOR control for forced engine ON for a long time in order to rapidly increase the coolant temperature.

Accordingly, when the engine is continuously maintained in an OFF state in a condition in which a vehicle stops for a long time while the outside air is cold (the state in which the vehicle is not capable of entering the HEV mode), the coolant temperature is greatly lowered, and thus because a heating load remarkably increases, the FATC 20 may determine whether the vehicle enters an idle mode in which the engine is driven for PFEOR control.

In detail, the operation of determining whether the vehicle enters the idle mode for the PFEOR control may include an operation of determining a coolant hysteresis temperature value $\beta_n$ for each heating load during engine OFF and an operation of comparing the determined coolant hysteresis temperature value $\beta_n$ with a threshold value to finally determine whether the vehicle enters the idle mode.

In this case, the coolant hysteresis temperature value $\beta_n$ may be determined using Equation 1 below and Equation 2 below, obtained by converting Equation 1 below in order to derive the coolant hysteresis temperature value $\beta_n$.

$$\text{Gradient}_n = \frac{\Delta \text{Temperature}}{\Delta \text{Time}} = \frac{(PFEOR_{on} - PFEOR_{off})}{\Delta T} \quad \text{[Equation 1]}$$

$$(PFEOR_{off} - PFEOR_{on}) = -(\text{Gradient}_n * \Delta T) = \beta_n \quad \text{[Equation 2]}$$

In Equations 1 and 2 above, gradient$_n$ is a coolant temperature descent gradient for each heating load, $\Delta T$ is a temperature variation, $PFEOR_{on}$ is a coolant temperature in the case of PFEOR control ON, and $PFEOR_{off}$ is a coolant temperature in the case of PFEOR control OFF.

In this case, the gradient$_n$ may be determined as several representative values through repetitive experiments for each heating load.

Figure 5:
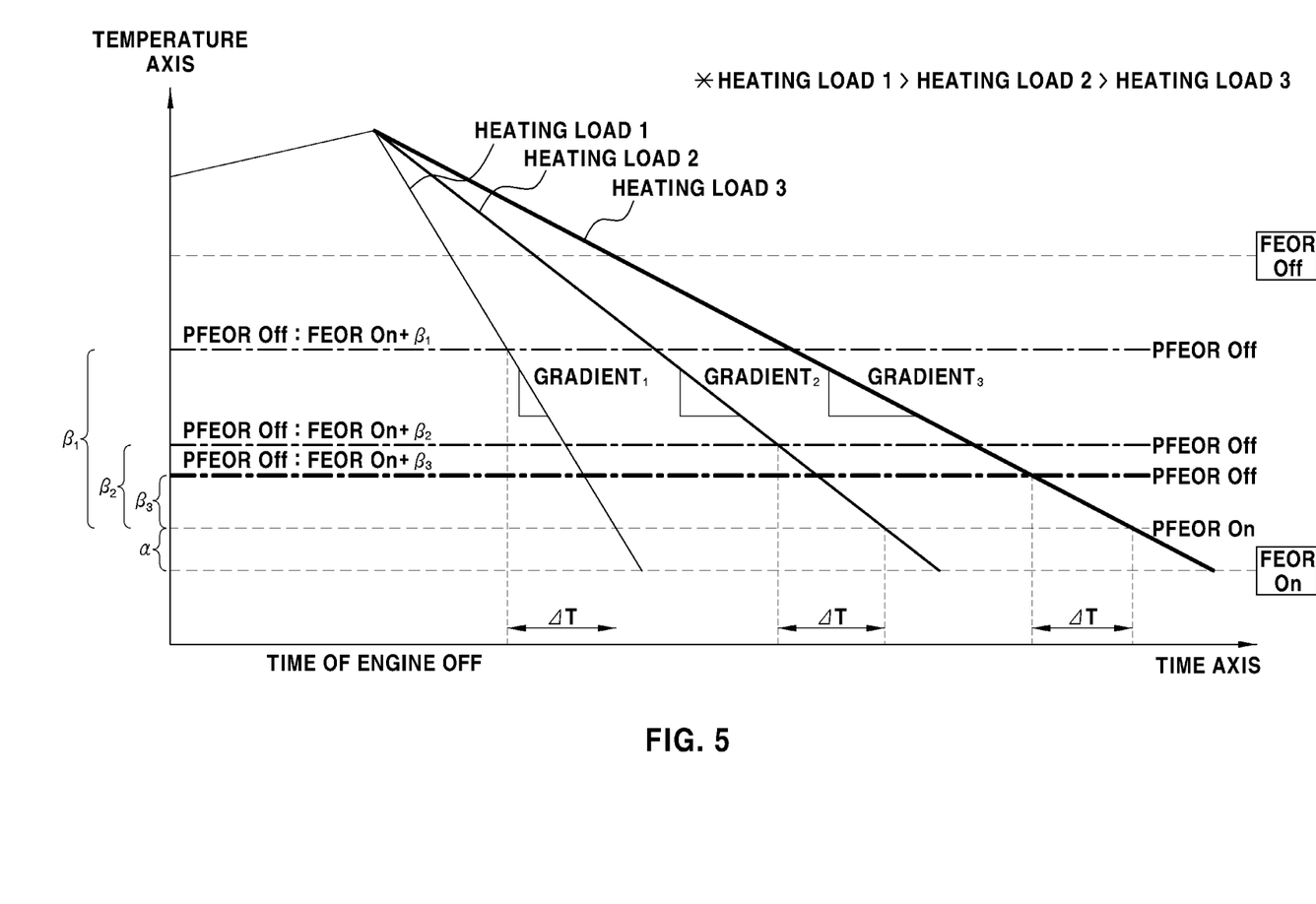
FIG. 5 is a graph showing a principle of differently determining a coolant hysteresis temperature value $\beta_n$ in a method of controlling heating of a hybrid electric vehicle in one form of the present disclosure.

Referring to FIG. 5, as the coolant temperature descent gradient$_n$ increases, that is, as a heating load increases, a coolant temperature descent rate is high, and thus the coolant hysteresis temperature value $\beta_n$ to the coolant temperature $PFEOR_{off}$ in the case of PFEOR control OFF from the coolant temperature $PFEOR_{on}$ in the case of PFEOR control ON based on a temperature variation $\Delta T$ for a predetermined time may be differently determined as $\beta_1$ to $\beta_3$, and the like.

As a result of comparison of the determined coolant hysteresis temperature value $\beta_n$ and the threshold value, when the determined coolant hysteresis temperature value $\beta_n$ is less than a threshold value, the vehicle may be determined to enter an idle mode, and when the determined coolant hysteresis temperature value $\beta_n$ is greater than the threshold value, the vehicle may be determined not to enter the idle mode.

In more detail, when the determined coolant hysteresis temperature value $\beta_n$ is less than the threshold value, the vehicle may be determined to enter the idle mode for engine driving for heating, and when the determined coolant hysteresis temperature value $\beta_n$ is greater than the threshold value, engine driving for heating may not be required, and the vehicle may be determined not to enter the idle mode.

In this case, the threshold value may be determined as a temperature at a level at which entry into FEOR control (FEOR ON) does not occur through preliminary testing even if the vehicle does not enter the idle mode in a condition in which the gradient$_n$ is reduced along with reduction in a heating load and simultaneously the coolant hysteresis temperature value $\beta_n$ is also reduced.

Then, as described above, through the operation of determining whether the vehicle enters the idle mode for PFEOR control depending on a heating load by the FATC 20, when finally determining that the vehicle enters the idle mode for the PFEOR control, the FATC 20 may transmit a pre-engine ON request bit signal to the HCU 10, which is a high-ranking controller (S107).

Thus, the HCU 10 may issue a command for a target engine torque value and a target RPM for the idle mode to the ECU 30 (S108) and the ECU 30 may perform engine idle speed control along with both the engine ON and the command of the HCU 10 (S109).

Figure 6:
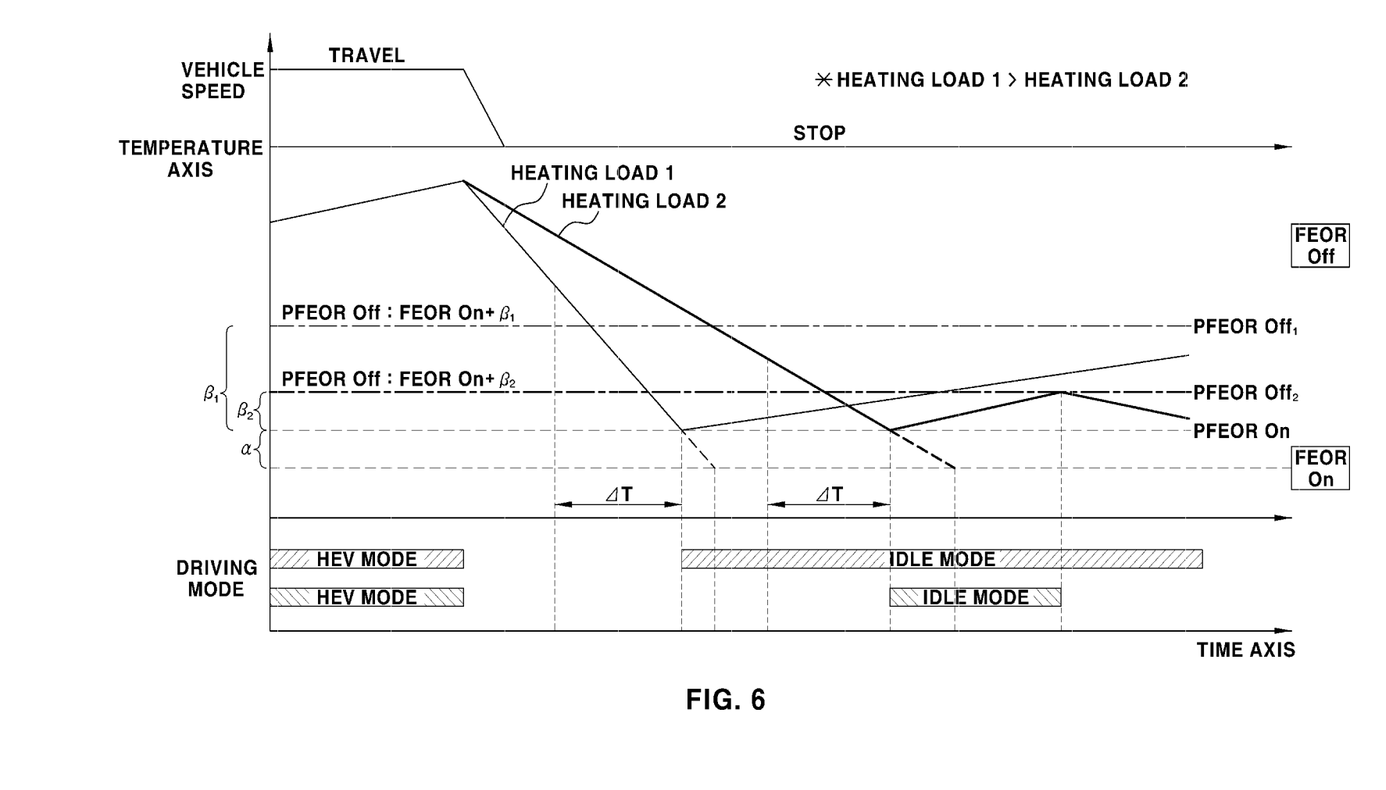
FIG. 6 is a graph showing the case in which a coolant temperature gradient for each heating load, which decreases due to entry into an idle mode, increases in a method of controlling heating of a hybrid electric vehicle in one form of the present disclosure.

Accordingly, as seen from FIG. 6, the coolant temperature gradient for each heating load, which decreases due to entry into the idle mode, increases, and this means that the coolant temperature for heating increases while an engine ON due to entry into the idle mode for PFEOR control occurs.

Figure 7:
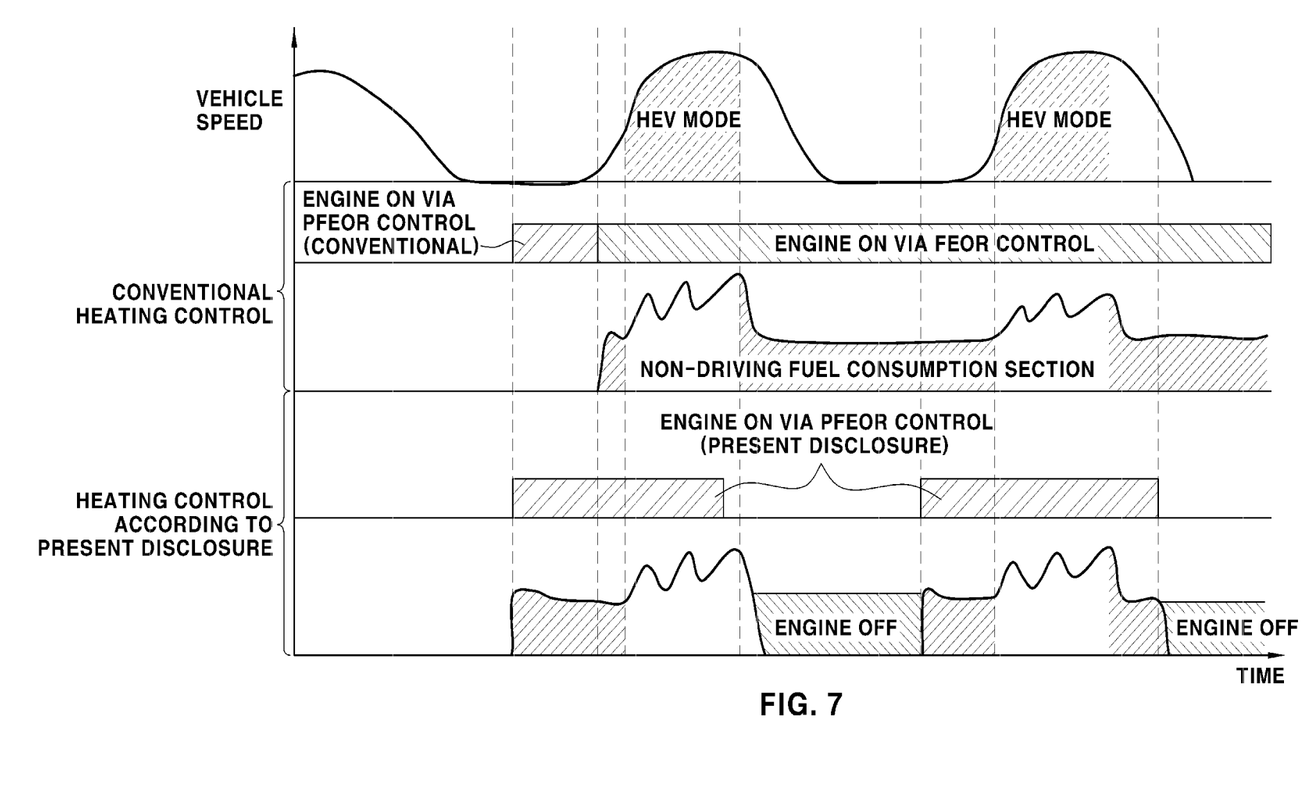
FIG. 7 is a graph showing a comparison between a heating control method in one form of the present disclosure and a conventional heating control method.

Referring to FIG. 7, with regard to conventional heating control, even if a vehicle enters engine ON via PFEOR control (which corresponds to a portion indicated by engine ON via PFEOR (conventional) in FIG. 7), there is a problem in that the PFEOR control is meaningless because the vehicle is switched to FEOR control for forced engine ON for a long time in order to rapidly increase the coolant temperature and that waste of fuel greatly occurs in a non-driving condition (a condition in which an engine is not used for driving the vehicle or a condition in which the engine is used for heating only), and accordingly, there is a problem in that fuel efficiency is degraded during the winter season.

On the other hand, as seen from FIG. 7, with regard to heating control according to the present disclosure, indoor heating performance may be improved and entry into FEOR control may also be prevented by performing engine ON due to entry into an idle mode via PFEOR control (which corresponds to a portion indicated by engine ON due to entry into the idle mode via PFEOR control (the present disclosure) in FIG. 7) in a condition in which the vehicle stops for a long time (the state in which the vehicle is not capable of entering the HEV mode), thereby minimizing waste of fuel and improving fuel efficiency in a non-driving condition.

The FATC 20 may further preform an operation of determining a release condition of an engine idle mode for the PFEOR control using Equation 3 below (S110).

$$PFEOR_{off} = PFEOR_{on} + \beta_n \quad [\text{Equation 3}]$$

In Equation 3 above, $PFEOR_{on}$ is a coolant temperature in the case of PFEOR control ON, $PFEOR_{off}$ is a coolant temperature in the case of PFEOR control OFF, and $\beta_n$ is a coolant hysteresis temperature value.

In this case, the coolant temperature $PFEOR_{off}$ in the case of PFEOR control OFF may be determined as the sum of the coolant temperature $PFEOR_{on}$ in the case of PFEOR control ON and the coolant hysteresis temperature value $\beta_n$.

Accordingly, the current engine coolant temperature and the coolant temperature $PFEOR_{off}$ in the case of PFEOR control OFF may be compared with each other (S111), and when the current engine coolant temperature is the coolant temperature $PFEOR_{off}$ in the case of PFEOR control OFF, heating control according to the present disclosure may be terminated.

The present disclosure may have the following effects pertaining to the aforementioned technical goals.

According to the present disclosure, entry into FEOR control may be prevented by performing engine ON due to entry into the idle mode via PFEOR control, thereby minimizing waste of fuel and improving fuel efficiency in a non-driving condition.

That is, in a condition in which a vehicle stops for a long time while the outside air is cold and a coolant temperature is greatly lowered, the vehicle may be prevented from being switched to FEOR control by performing engine ON due to entry into the idle mode according to a coolant temperature descent gradient for each heating load, and thus indoor heating performance may be improved, and moreover, waste of fuel may also be minimized in a non-driving condition, thereby improving fuel efficiency.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. A method of controlling heating of a hybrid electric vehicle (HEV), the method comprising:
   receiving a heating request from a driver;
   when the heating request is received from the driver, determining whether an entry condition of full automatic temperature control (FATC) engine ON request (FEOR) control is satisfied;
   when the entry condition of the FEOR control is not satisfied, determining whether an entry condition of pre-FATC engine ON request (PFEOR) control is satisfied;
   when the entry condition of the PFEOR control is determined to be satisfied, checking whether the vehicle is capable of entering a HEV mode;
   when checking that the vehicle is not capable of entering the HEV mode, determining whether the vehicle enters an idle mode for the PFEOR control;
   when determining that the vehicle enters the idle mode for the PFEOR control, issuing a command for a target engine torque value and a target revolutions per minute (RPM) for the idle mode to an engine control unit (ECU) from a hybrid control unit (HCU); and
   performing an engine idle speed control along with engine ON based on the command,
   when the target coolant temperature+α is greater than the current coolant temperature or the target discharge port temperature+α is greater than the current discharge port temperature, determining that the entry condition of the PFEOR control is satisfied.

2. The method of claim 1, wherein determining whether the vehicle is capable of entering the idle mode for the PFEOR control comprises:
   determining a coolant hysteresis temperature value βn for each heating load during engine OFF; and
   comparing the determined coolant hysteresis temperature value βn with a threshold value and determining whether the vehicle enters the idle mode.

3. The method of claim 2, further comprising:
   when it is determined that the coolant hysteresis temperature value βn is less than the threshold value, determining that the vehicle enters the idle mode for engine driving for heating; and
   when it is determined that the coolant hysteresis temperature value βn is greater than the threshold value, determining that engine driving for heating is not required and the vehicle does not enter the idle mode.

4. The method of claim 2, wherein determining the coolant hysteresis temperature value $\beta_n$ comprises:
   determining the coolant hysteresis temperature value βn using $(PFEOR_{Off} - PFEOR_{On}) = -(\text{Gradient}_n * \Delta T) = \beta_n$ obtained by converting $$\text{Gradient}_n = \frac{\Delta \text{Temperature}}{\Delta \text{Time}} = \frac{(PFEOR_{on} - PFEOR_{off})}{\Delta T}$$

for deriving the coolant hysteresis temperature value βn,
   where $\text{gradient}_n$ is a coolant temperature descent gradient for each heating load, $\Delta T$ is a temperature variation, $PFEOR_{on}$ is a coolant temperature in a case of PFEOR control ON, and $PFEOR_{off}$ is a coolant temperature in a case of PFEOR control OFF.

5. The method of claim 2, further comprising:
   determining that the threshold value is a temperature at a level at which entry into FEOR control (FEOR ON) does not occur through preliminary testing.

6. The method of claim 1, further comprising:
   determining a release condition of an engine idle mode for the PFEOR control by using $PFEOR_{off} = PFEOR_{on} + \beta n$, where $PFEOR_{on}$ is a coolant temperature in a case of PFEOR control ON, $PFEOR_{off}$ is a coolant temperature in a case of PFEOR control OFF, and $\beta_n$ is a coolant hysteresis temperature value.

7. The method of claim 6, further comprising:
   comparing a current engine coolant temperature with the coolant temperature $PFEOR_{off}$ in the case of PFEOR control OFF; and
   terminating heating control when the current engine coolant temperature is the coolant temperature $PFEOR_{off}$ in the case of PFEOR control OFF.

8. An apparatus for controlling heating of a hybrid electric vehicle (HEV), the apparatus comprising:
   a full automatic temperature control (FATC) configured to:
   receive a heating request from a driver;
   when the heating request is received from the driver, determine whether an entry condition of FATC engine ON request (FEOR) control is satisfied;

when the entry condition of the FEOR control is not satisfied, determine whether an entry condition of pre-FATC engine ON request (PFEOR) control is satisfied;

when the entry condition of the PFEOR control is determined to be satisfied, check whether the vehicle is capable of entering a HEV mode; and when it is checked that the vehicle is not capable of entering the HEV mode, determine whether the vehicle enters an idle mode for the PFEOR control;

a hybrid control unit (HCU) configured to, when it is determined that the vehicle enters the idle mode for the PFEOR control, issue a command for a target engine torque value and a target revolutions per minute (RPM) for the idle mode to an engine control unit (ECU) using a pre-engine ON request bit signal of the FATC; and the ECU configured to perform engine idle speed control along with engine ON based on the command, wherein when a target coolant temperature+α is greater than a current coolant temperature or a target discharge port temperature+α is greater than a current discharge port temperature, the FATC determines that the entry condition of the PFEOR control is satisfied.

9. The apparatus of claim 8, wherein, when determining whether the vehicle is capable of entering the idle mode for the PFEOR control, the FATC is further configured to:

determine a coolant hysteresis temperature value βn for each heating load during engine OFF; and compare the determined coolant hysteresis temperature value βn with a threshold value and determine whether the vehicle enters the idle mode.

10. The apparatus of claim 9, wherein the FATC is further configured to:

when the coolant hysteresis temperature value βn is less than the threshold value, determine that the vehicle enters the idle mode for engine driving for heating; and when the coolant hysteresis temperature value βn is greater than the threshold value, determine that engine driving for heating is not required and the vehicle does not enter the idle mode.

11. The apparatus of claim 9, wherein the FATC is configured to determine the coolant hysteresis temperature value βn using $(PFEOR_{Off} - PFEOR_{On}) = -(Gradient_n * \Delta T) = \beta_n$ that is obtained by converting $$Gradient_n = \frac{\Delta Temperature}{\Delta Time} = \frac{(PFEOR_{on} - PFEOR_{off})}{\Delta T}$$

for deriving the coolant hysteresis temperature value $\beta_n$, where $gradient_n$ is a coolant temperature descent gradient for each heating load, $\Delta T$ is a temperature variation, $PFEOR_{on}$ is a coolant temperature in a case of PFEOR control ON, and $PFEOR_{off}$ is a coolant temperature in a case of PFEOR control OFF.

12. The apparatus of claim 9, wherein the FATC is further configured to:

determine that the threshold value is a temperature at a level at which entry into FEOR control (FEOR ON) does not occur through preliminary testing.

13. The apparatus of claim 8, wherein the FATC is further configured to:

determine a release condition of an engine idle mode for the PFEOR control by using $PFEOR_{off} = PFEOR_{on} + \beta_n$, where $PFEOR_{on}$ is a coolant temperature in a case of PFEOR control ON, $PFEOR_{off}$ is a coolant temperature in a case of PFEOR control OFF, and $\beta_n$ is a coolant hysteresis temperature value.

14. The apparatus of claim 13, wherein the FATC is configured to:

compare a current engine coolant temperature with the coolant temperature $PFEOR_{off}$ in a case of PFEOR control OFF; and terminate heating control when the current engine coolant temperature is the coolant temperature $PFEOR_{off}$ in the case of PFEOR control OFF.

* * * * *